March 26, 1963  R. M. INGHAM, JR  3,082,908
BOBBIN HANDLING ARRANGEMENT
Filed Oct. 13, 1958  3 Sheets-Sheet 1
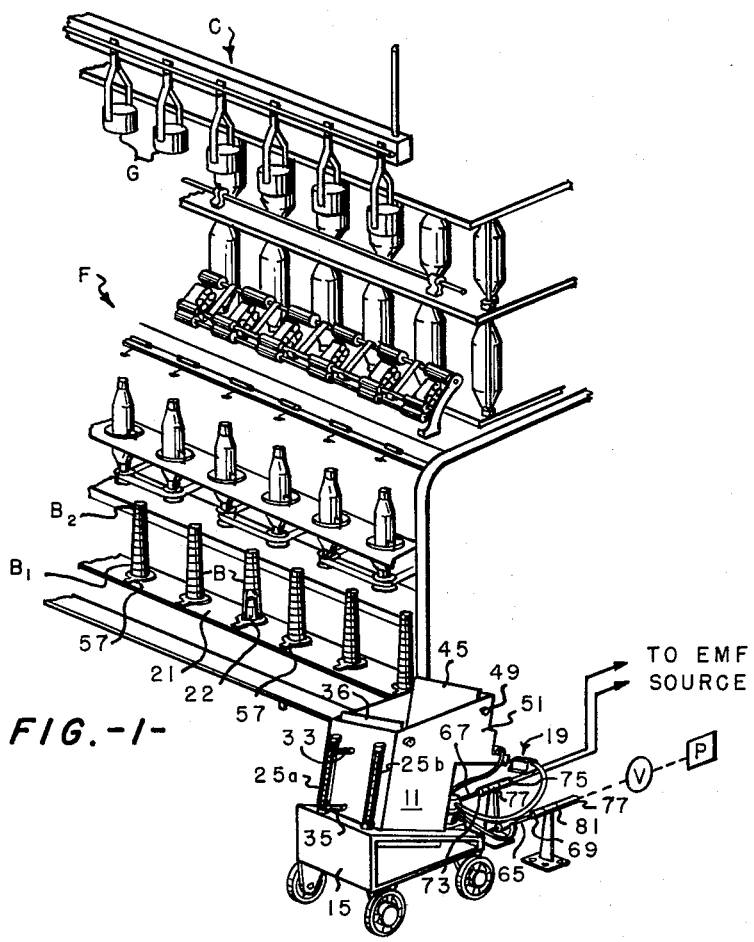
FIG.-1-
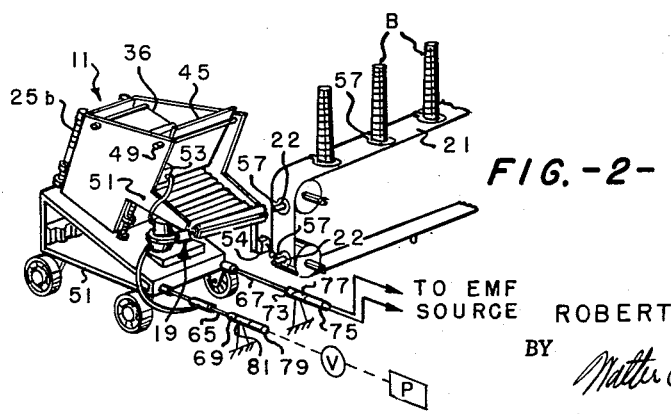
FIG.-2-
INVENTOR.
ROBERT M. INGHAM, JR
BY
ATTORNEY

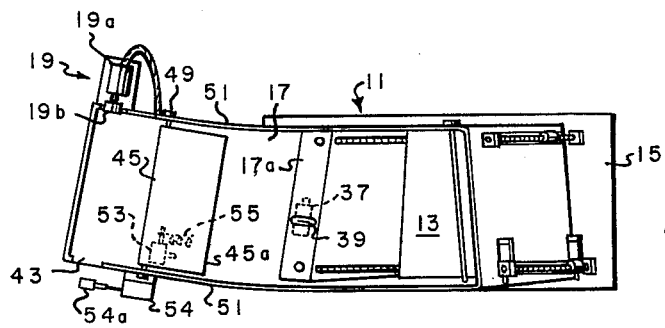
FIG.-4-
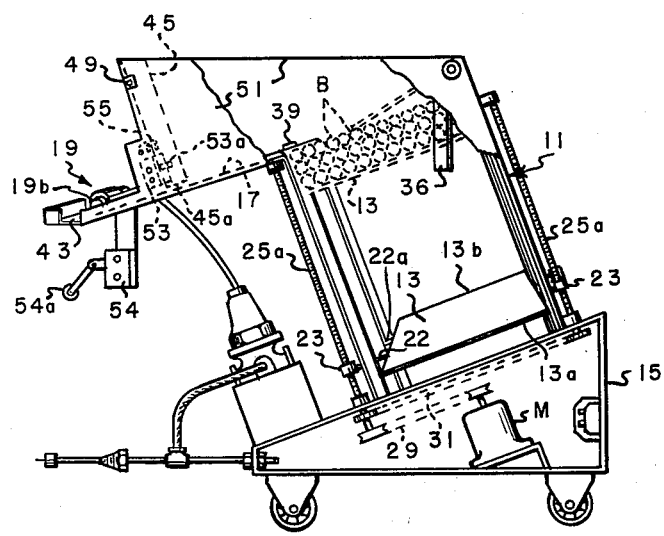
FIG.-3-
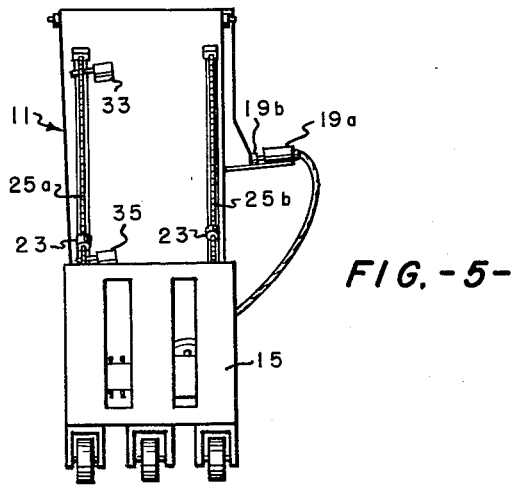
FIG.-5-
INVENTOR.
ROBERT M. INGHAM, JR.
BY
ATTORNEY

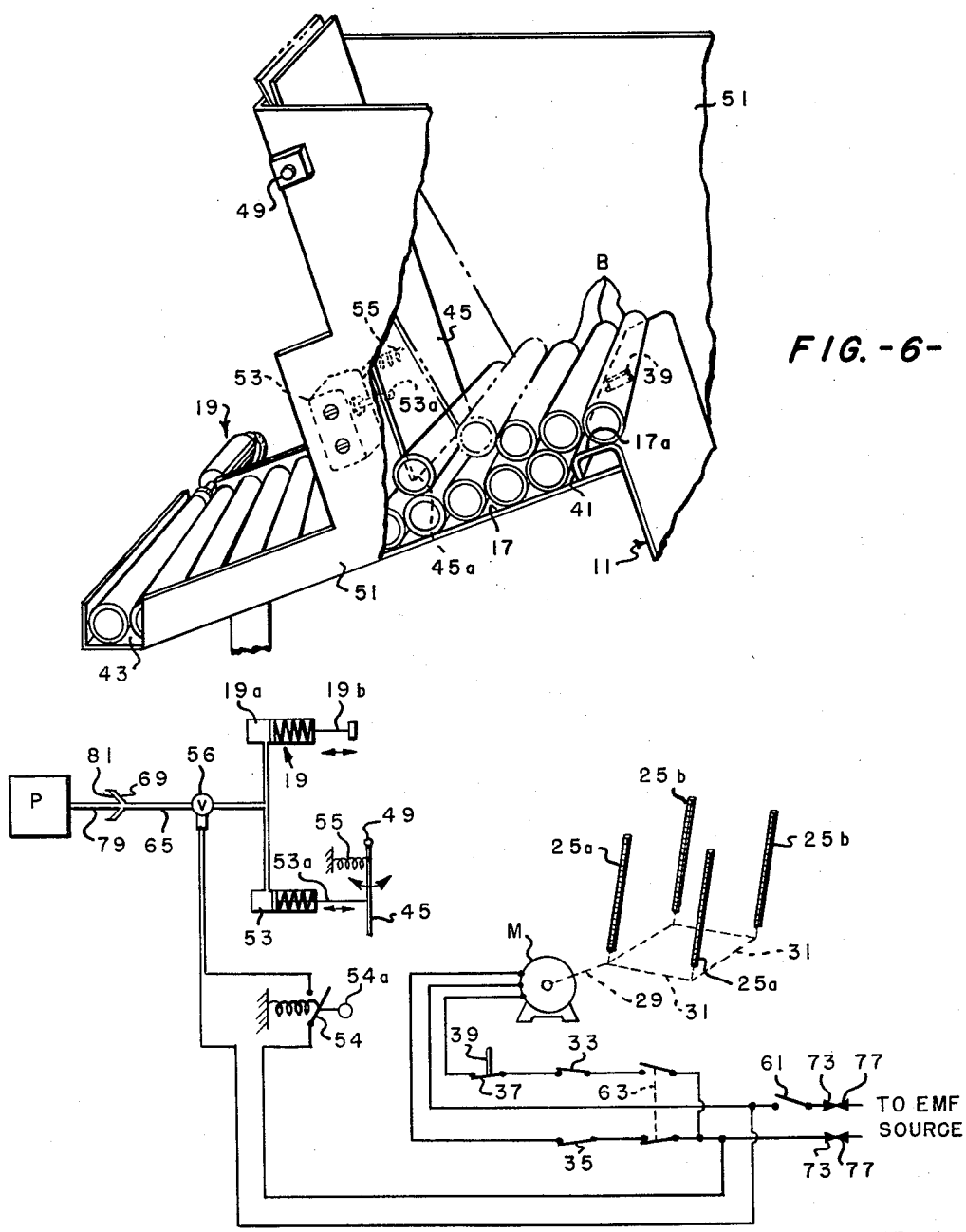

United States Patent Office 3,082,908
Patented Mar. 26, 1963

3,082,908
BOBBIN HANDLING ARRANGEMENT
Robert M. Ingham, Jr., Spartanburg, S.C., assignor to Deering Milliken Research Corporation, Pendleton, S.C., a corporation of Delaware
Filed Oct. 13, 1958, Ser. No. 767,013
14 Claims. (Cl. 221—11)

This invention relates to a bobbin serving arrangement, and more particularly to a movable bottom doff cart or box arrangement.

One embodiment of the invention takes the form of a doff box preferably formed as a cart having a differentially movable bottom positively raised to serve each succeeding top layer of bobbins in one common plane at a selected height above the cart bottom, the bobbins having their head ends of a different size from their butt ends. As an ancillary feature according to the invention each succeeding top layer is served too a bobbin ejecting device, the bobbins being presented thereto in a self-controlled reservoir of side-by-side bobbins of single layer depth. According to this auxiliary feature the self-controlling reservoir action preferably controls the bobbin serving action of the doff cart by controlling the movement of the differentially movable bottom. It will be apparent, however, as the description proceeds that a doff cart, or box as the case may be, may be employed according to that feature of the invention without any ejecting mechanism, for instance solely for serving or presenting succeeding layers of bobbins to an operator for manual removal if desired.

A physical embodiment constructed in accordance with the invention is illustrated in the accompanying drawings, wherein FIGURE 1 is a partial front perspective view of an embodiment of the invention as employed in conjunction with a bobbin doffing and donning arrangement for a spinning frame.

FIGURE 2 is a partial rear perspective view of a portion of the arrangement of FIGURE 1.

FIGURES 3–5 are side, plan and rear views respectively of the doff cart of FIGURE 1, FIGURE 3 being partially cut away for ease of illustration.

FIGURE 6 is an enlarged fragmentary view of the bobbin ejecting portion of the doff cart of FIGURE 1.

FIGURE 7 is a schematic illustration of a control circuit employed in the illustrated embodiment.

Referring now in detail to the figures of the drawings, an inclined bobbin-holding box 11 having a movable flat false bottom 13 is fixedly secured to a portable wheeled truck base 15. The doff box 11 is inclined to the horizontal in this embodiment in order that the top layer of bobbins thereon may suitably move under the influence of gravity down an inclined chute 17 connected between the top of the doff box per se and an intermittently actuated discharge and seating plunger arrangement 19 including an air cylinder 19a and a movable piston plunger 19b for discharging the bobbins individually from the chute 17 and suitably seating them on a belt 21 or other suitable receiver which in the instant embodiment is disposed along the front of a spinning frame generally indicated at F, and adapted for transfer of bobbins B between the belt 21 and frame F as by hand or other suitable means such as a bobbin transfer device such as a carrier generally indicated at C and having a plurality of bobbin graspers G thereon.

The doffing box arrangement is particularly adapted for handling of warp bobbins B or other bobbins having a large diameter at one end $B_1$ and a smaller diameter at the other end $B_2$. As will be apparent, the lowering of bobbins of this differential diameter nature into a box with all of their butt ends $B_1$ directed in the same direction poses a problem, particularly if one desires to maintain the top layer of the bobbins horizontally or aligned with some other desired plane at all times, and more specifically if one is to raise each layer of bobbins in the box to a horizontal or other desired plane at a specific level for discharge therefrom. The unique solution of this problem is an important feature of this invention. In the illustrated embodiment the movable bottom 13 is suitably carried by nut followers 23 on cross bars or shafts 22, 22a connecting respectively between each pair of followers 23 on two sets of positively actuated lead screws 25a, 25b each inclined in the same direction as the upwardly extending sides of the doff box 11. The bottom 13 may be pivotally connected to one of the shafts 22, 22a and loosely resting on the other shaft, or may be loosely resting on both shafts if desired. Each of the pair of screws 25a connected to the end of the box bottom on which the large ends of the bobbins are disposed is similar in pitch, as is the pitch of the two lead screws 25b, the screws 25a having a larger pitch than the pair of screws 25b supporting the end of the box bottom at which the small ends of the bobbin lie. This lead screw and follower arrangement 25a, 23 and 25b, 23, thus forms a differential-motion-imparting drive for the bottom 13, being operatively connected to the bottom 13 at spaced-apart positions, each of the two sets of lead screws and follower nuts 25a, 23, and 25b, 23, being operative to raise and lower the bottom in the same upward or downward directions but by differential amounts with respect to one another.

In the lowermost position of the movable bottom 13 the angle of inclination of the upper surface of the movable bottom is such as to dispose the bottom surface of the top layer of bobbins B in the doff box parallel with the immediately adjacent bottom surface 17a of the conveyor chute 17 connected thereto. Also, the relative pitch of the two sets of screws 25a, 25b is such that the driving of the screws are at the same speed, as by a reversible motor M mounted on the supporting base and suitably connected as by a belt and chain drive 29, 31 in driving relation to the screws 25a, 25b, causes the two ends of the movable false bottom to be moved at a differential rate such as to present the bottom of each succeeding top layer of bobbins in parallel relation to the adjacent bottom 17a of the conveyor chute 17. Alternatively, the pitch of the two sets of screws may be identical and the drive thereto arranged to drive one set 25a at a faster rotary rate than the other set 25b. It will thus be apparent that the rate of upward travel of the lower end 13a of the movable bottom 13 will be greater than the rate of travel of the upper end 13b of the movable bottom. The position of the movable bottom 13 is shown in FIGURE 3 at its lowermost position in full lines and in an intermediate upper position in dotted lines, in each case the supported surface of the bobbins in the upper layer being parallel to bottom of the adjacent inclined conveyor chute 17.

In order to afford semi-automation to the movable bottom 13 once the drive motor M is actuated to move the bottom upwardly, a suitable limit switch 33 in the form of a micro-switch or the like may be disposed adjacent the upper end of travel of the movable bottom, which switch is in controlling relation to the drive motor, and a further limit switch 35 may be disposed adjacent the lower end of travel of the movable bottom for actuation by the bottom or by a protuberance on or adjacent the bottom, this switch also being in controlling relation to the motor. Also, a pivoted top overflow guard plate 36 is provided to prevent the overflow of bobbins at the rear of the box 11 as the bottom 13 is moved progressively upward and bobbins are fed from the box onto the chute.

A further normally closed control switch 37 is disposed in the discharge path of bobbins from the doff box 11. In the instant embodiment this switch 37 has an actuating finger 39 spring-biased upwardly and protruding through the chute surface 17a disposed adjacent the discharge edge of the doff box 11.

When the finger 39 is pressed down by the weight of a bobbin or bobbins B thereon the switch 37 is opened, thereby breaking the "raise" circuit to the motor M, whereas when the finger 39 is in its normal spring biased raised position with no bobbins lying thereon the switch 37 is closed and the motor M may be started and will continue to run while the motor "raise" circuit is closed, this action continuing until either of switches 33 or 37 is opened. It will be seen that in the open position of switch 37 (down position of finger 39) the upper layer of bobbins in the box is disposed in alignment with the top surface 17a of the immediately adjacent bottom of the chute 17, and the bobbins in this layer will thus slide or roll down toward the lower end of the chute 17 for discharge therefrom.

In passing down the inclined chute 17 the bobbins pass beneath the lower end 45a of a pivoted kicker door or plate 45 and down to the lower end of the chute 17 where they are individually ejected by intermittent action of solenoid-controlled air-driven plunger 19b disposed at one lateral side of the lower end of the chute. The opposite side wall of the lower end of the chute is open to form a discharge opening 43 and permits a bobbin to be discharged butt-end $B_1$ first onto a suitable receiving device such as belt 21 or the like which may advantageously have a plurality of bobbin receiving and holding members 22 disposed in spaced apart relation thereon.

In order to permit the accumulation of a suitable reservoir of bobbins in the chute 17 while providing for adequate movement of the bobbins to the discharge device the kicker 45 is suitably pivotally mounted as indicated at 49 and extends downwardly between the side walls 51 of the chute, its lower end 45a being disposed above the adjacent bottom of the chute by a distance slightly greater than the diameter of the large end $B_1$ of the bobbins. The kicker 45 is intermittently sharply moved rearwardly toward any bobbins laying thereagainst, in order to free the lower layer of bobbins from the holding action of any upper layer of bobbins lying thereon and permit the bobbins in the lower layer to proceed downwardly in the normal course along the bottom of the chute 17 and beneath the lower end 45a of the kicker. To this end an air cylinder 53 having a piston plunger 53a suitably mounted adjacent the opposite face of the kicker 45 and is intermittently actuated to pivot the door rearwardly. A return spring 55 is suitably connected between this opposite face of the kicker and a part of the chute wall structure for insuring return of the door to its quiescent position in contact with or closely adjacent the plunger 53a. Formed adjacent the chute surface 17a is a step having an anti-reverse shoulder stop 41 for preventing the bottom layer of bobbins on the chute 17 from being kicked back into the box 11 by the kicking action of the kicker plate 45.

Operation of the two air driven plungers 19b and 53a may be achieved by a suitable control switch 54 connected in controlling relation to a solenoid valve 56 which controls the air supply to each of the air driven plungers, the control switch being in turn intermittently actuated as by the intermittently recurring striking of an actuating finger 54a thereof by a moving cam device which may suitably take the form of a plurality of suitably positioned lugs, detents or the like 57 disposed on the bobbin receiving belt 21 moving adjacent the discharge opening 43 for the bobbins and adapted to sequentially contact the control switch finger for discharge and seating of a bobbin onto a respective bobbin holder 22 during movement of the belt 21 past the finger. The intercoupled action of the kicker 45 and discharge plunger 19 is most advantageous, and is preferred; however, if desired, the pivoted kicker 45 may be periodically or otherwise intermittently actuated without control by the control switch 54 for the bobbin discharge plunger 19.

In FIGURE 7 is shown an illustrative simplified schematic diagram of the control arrangement of the illustrated embodiment of the apparatus in accordance with the invention. As seen in this figure a main start switch 61 controls the supply of E.M.F. to both the motor M which drives the bottom-moving screws 25a, 25b and to the solenoid valve 56 for controlling the air pressure from the pressure source P to the two air cylinders 19 and 53. The solenoid valve control switch 54 actuated by movement of the cam lugs 57 on the belt 21 is in series relation with the solenoid valve 56 and is normally spring biased open, this normally open position resulting in the solenoid valve 56 being closed whereby no air pressure is supplied to the two air cylinders 19a and 53. Closing of the switch 54 in response to contact of the cam lugs 57 on the belt with the switch control fingers 54a causes opening of the solenoid valve 56 to thereupon connect the air pressure supply to the air cylinders, the piston plungers of which move the depending kicker plate 45 and the bobbin B lying in the chute adjacent the discharge opening 43.

Through the medium of a motor reverse switch generally indicated at 63 the motor M may be driven in either selected direction to selectively raise or lower the movable false bottom 13 of the doff box 11 by selective rotation of the screws in either direction. The lower limit switch 35 is disposed in series with the reverse contacts of the motor reverse switch, whereas the upper limit switch 33 and the chute switch 37 are dispsoed each in series with the forward contacts of switch 63 for the motor M. While this circuit is shown in simplified form, this is done only by way of illustration and it will be apparent that in practice various modifications thereof may be desirable for a particular embodiment.

In order to aid in the proper positioning of the movable doff cart 11, 15 relative to the belt 21 or other receiving device, and also in order to simplify the supply of air pressure and electrical power to the doff cart for operation thereof rather than including such supply on the doff cart per se, the doff cart is provided with two rigid hollow horizontal conduits 65, 67 one of which is an air conduit 65 and the other of which is an electrical conduit 67. The air conduit 65 has a suitable male or female coupling connector 69 at its outer end and is in air supply connection to the two air cylinders 19a and 53. The other conduit 67 encloses suitable electrical connecting lines between a connector 73 at its outer end and the electrical circuitry to the various electrical control elements of the doff cart. Disposed in suitable fixed relation on the floor or other fixed support adjacent the belt are a pair of rigid conduits 75, 79 having corresponding coupling connectors 77, 81 at the same height as and for engagement by the respective electrical and air pressure connectors 73, 69 disposed on the ends of the conduits 67, 65 of the doff cart.

The two fixed connectors 77, 81 are connected in any suitable manner to a source of E.M.F. and a source of air pressure P for supply to the doff cart upon the connecting of the corresponding doff cart connectors 69, 73 and the fixed connectors 77, 81 together. As stated above, the connectors serve a dual purpose, serving in addition to the supply of air pressure and E.M.F. to the doff cart the further function of locating the doff cart in the proper position relative to the bobbin receiving belt at the loading station. This may be readily accomplished through the medium of the present apparatus by locating the fixed electrical and supply pressure conduits 75, 79 and their respective connectors at a suitable position on the floor or other fixed support at the loading station so that the discharge and seating plunger 19b and the switch actuating finger 54a will be properly located relative to the belt 21 and its receiving members 22 and switch actuating lugs 57.

While a single embodiment of the invention has been illustrated and described herein it will readily be apparent that many modifications and improvements may be made without departing from the scope and spirit of the invention. It is therefore to be understood that the invention is not to be limited by the illustrated embodiment but only by the scope of the appended claims.

That which is claimed is:

1. A material serving device comprising a box having lateral walls and a vertically movable bottom mounted for operative working movement substantially simultaneously in the same general direction at all points thereof, a differential-motion-imparting drive including two differentially movable motion-imparting elements operatively connected in differential upward and downward similar directional moving relation to said bottom at two spaced apart positions on said bottom, and means for differentially moving each of said two motion-imparting elements.

2. A material serving device comprising a box having lateral walls and a vertically movable bottom mounted for operative working movement substantially simultaneously in the same general direction at all points thereof, and a differential-motion-imparting drive operatively connected in differential upward and downward similar directional moving relation to two spaced apart positions on said bottom, said differential drive comprising two screws, followers operatively connected to said bottom and being complementary to and in engagement with said screws, and means for rotating said screws.

3. A device according to claim 2 wherein one of said screws has a pitch different from the pitch of the other said screw.

4. A device according to claim 2 wherein said means for rotating said screws is a motor, said device including control means for said motor.

5. A device according to claim 4 wherein said control means includes a first upper limit switch disposed adjacent one of said walls and adapted to be actuated in response to movement of said bottom to and from a predetermined uppermost position.

6. A device according to claim 5 wherein said control means includes a lower second limit switch disposed on one of said walls and adapted to be actuated in response to movement of said bottom to and from a predetermined lowermost position.

7. A device according to claim 6 wherein said control means further comprises a third limit switch adapted to be actuated as a function of movement of a top layer of bobbins by said bottom to a predetermined height position.

8. A device according to claim 7 wherein said control means includes a bobbin sensing element disposed in the path of movement of bobbins from said box, said bobbin sensing element being arranged in controlling relation to said third limit switch.

9. A material serving device comprising a box having lateral walls and a vertically movable bottom mounted for operative working movement substantially simultaneously in the same general direction at all points thereof, and a differential-motion-imparting drive operatively connected in differential upward and downward similar directional moving relation to two spaced apart positions on said bottom, said differential drive comprising two sets of two spaced apart screws and corresponding followers for each of said screws; said followers being operatively connected in pivoted relation to said bottom, and means for rotating said screws.

10. A material serving device comprising a box having lateral walls and a vertically movable bottom mounted for operative working movement substantially simultaneously in the same general direction at all points thereof, and a differential-motion-imparting drive operatively connected in differential upward and downward similar directional moving relation to two spaced apart positions on said bottom, said box being tilted from the vertical, said device further comprising an inclined discharge chute operatively connected to the top of one of said walls on the downwardly tilted side.

11. A device according to claim 10 including a bobbin sensing element disposed in said discharge chute, said bobbin sensing element being arranged in controlling relation to said drive.

12. A device according to claim 11 further including a bobbin-ejecting means disposed adjacent the lower end of said inclined chute, and means for intermittently actuating said bobbin-ejecting means.

13. A device according to claim 12 said bobbin-ejecting means comprising an air driven plunger disposed adjacent one lateral side of said chute and having its line of plunger movement transverse to the direction of inclination of said chute.

14. A device according to claim 2 wherein said screws are driven at different angular rates of rotation relative to one another.

References Cited in the file of this patent

UNITED STATES PATENTS

| | | |
|---|---|---|
| 1,252,562 | Fassinger | Jan. 8, 1918 |
| 1,688,369 | Willard | Oct. 23, 1928 |
| 1,806,399 | Jippson | May 19, 1931 |
| 1,833,292 | Krick | Nov. 24, 1931 |
| 1,857,881 | Scott et al. | May 10, 1932 |
| 1,861,834 | Binggeli | June 7, 1932 |
| 1,891,922 | Eisenberg | Dec. 27, 1932 |
| 2,193,893 | Van Vleck | Mar. 19, 1940 |
| 2,219,525 | Maxon | Oct. 29, 1940 |
| 2,478,145 | Weber | Aug. 2, 1949 |
| 2,479,396 | Nelson | Aug. 16, 1949 |
| 2,571,576 | Hopkins et al. | Oct. 16, 1951 |
| 2,707,142 | Waite | Apr. 26, 1955 |
| 2,787,303 | Coder et al. | Apr. 2, 1957 |

FOREIGN PATENTS

| | | |
|---|---|---|
| 9,529 | Great Britain | of 1914 |
| 297,465 | Italy | June 13, 1932 |
| 623,125 | Germany | Dec. 13, 1935 |
| 649,976 | Germany | Sept. 11, 1937 |
| 925,478 | Germany | Mar. 24, 1955 |